US007184258B2

(12) United States Patent
Lai

(10) Patent No.: US 7,184,258 B2
(45) Date of Patent: Feb. 27, 2007

(54) SOCKET POWER SUPPLY CONTROL STRUCTURE

(76) Inventor: Li-Chun Lai, 21F-1, No. 33, Sec. 1, Minsheng Rd., Panciao City, Taipei (TW)

( * ) Notice: Subject to any disclaimer, the term of this patent is extended or adjusted under 35 U.S.C. 154(b) by 308 days.

(21) Appl. No.: 10/968,904

(22) Filed: Oct. 21, 2004

(65) Prior Publication Data

US 2006/0039102 A1 Feb. 23, 2006

(30) Foreign Application Priority Data

Aug. 20, 2004 (CN) .................. 2004 2 0703723 U

(51) Int. Cl.
*H02B 1/26* (2006.01)
*H01R 13/70* (2006.01)
*H01R 13/502* (2006.01)

(52) U.S. Cl. .................... 361/641; 200/51 R; 439/687

(58) Field of Classification Search ............. 200/51 R, 200/44, 42; 361/641; 439/133, 455, 465, 439/620.1, 52
See application file for complete search history.

(56) References Cited

U.S. PATENT DOCUMENTS

| | | | | |
|---|---|---|---|---|
| 5,731,763 | A * | 3/1998 | Herweck et al. | 340/825.69 |
| 5,911,586 | A * | 6/1999 | Wintergerst | 439/133 |
| 6,012,941 | A * | 1/2000 | Burdenko et al. | 439/373 |
| 6,461,176 | B1 * | 10/2002 | Haas | 439/133 |

* cited by examiner

*Primary Examiner*—Greg Thompson

(57) ABSTRACT

A socket power supply control structure is controlled by a controller in three stages, e.g. "power on," "power off", and "power source disconnected". By so, unauthorized use of outlet supplying power for working various electrical appliances such as television computer, and microwave oven, by innocent children can be effectively avoided so as to protect their health of eyes and electric safety.

9 Claims, 10 Drawing Sheets

SOCKET POWER SUPPLY CONTROL STRUCTURE

BACKGROUND OF THE INVENTION

1. Field of the Invention

The present invention relates to a socket power supply control structure, and more particularly, to a power supply outlet for household electrical appliances enclosed in a housing, and whose ON/OFF power supply is controlled by a controller in three stages.

2. Description of the Prior Art

In keeping pace with the economic development and progress in science, an average family may own several household electrical appliances such as television sets and computers etc. Now, the television and computer have already become necessary facilities of civilization. On the other hand, watching TV or operating the computer too longer might greatly degrade the eyesight of the user, especially the children. To avoid such disadvantage, prohibiting the children to watch TV or operate the computer at home for longer time is very important. But the problem is that the outlets of the residential wiring are in energized stage all the time that makes children easy to turn on these two appliances at any time and keep them working as long as desired. How will it be ideal for parents if ON/OFF of the outlets can be controlled properly by some means so as to limit their children to overuse the television and computer thereby contributing to health of their eyes!

It is what the reason the inventor has endeavored for years by continuous research and experimentation attempting to find out the remedy to rectify the inherent shortcoming of the conventional residential wiring outlet described above, and at last has succeeded in coming out with the present invention.

SUMMARY OF THE INVENTION

Accordingly, the present invention is to provide a socket power supply control structure applicable to control random use of the household electrical appliances applicable to control random use of the household electrical appliances such us the television, the computer, and various heating appliances so as to protect users form being injured from inappropriate use of such appliances.

Another, the present invention is to provide a controller with an ability to control the power supply to the household outlet with three stages, e.g. energized, de-energized, and completely disconnected from the power source.

The socket power supply control structure of the present invention includes a lower housing, a controller, an extension cord plug, a siamese twin plug and socket connector, a latch, an upper housing, and an enclosure. The lower housing is divided into a first, a second and a third accommodation spaces. A three stage controller installed in the first accommodation space has an approximately ellipsoidal cap nut provided around its middle portion with a key bolt accompanying with a switching key to turn the cap nut. The controller is located distantly apart from one side of the second accommodation space and is connected to a plug with extension cords so that the controller can get the power supply. The other side of the controller proximate to the second accommodation space is connected to a siamese twin plug and socket connector so as to control ON/Off of the power supply to the plug and socket connector. The first accommodation space is enclosed by the upper housing whose top surface being emerged to form key bolt. A drilled hole is formed on the upper housing near the second accommodation space. A sliding way is provided on the bottom surface of the upper housing and is extended out of the end surface where the drilled hole is formed. The latch whose cross section is configured into an approximate T shape is provided with a compressed spring fitted on it for giving restoring force to the latch. The latch is laid in the sliding way capable of entering the drilled hole and in close contact with the cap nut to reciprocate along with the movement of the cap nut. The third accommodation space admits entrance of the power input plug of the appliance to be inserted into the socket side of the plug and socket connector. An enclosure is provided to cover the second and third accommodation spaces, so as to be turnable on the lower housing, and an insertion hole is provided nearby the end surface of the first accommodation space, and is aligned to the drilled hole on the upper housing to communicate with each other thereby enabling the latch to pierce into the front insertion hole of the enclosure. With the structure described above, the three stage controlling mode can be carried out by the controller with a switching key inserted into the key bolt emerged out of the upper housing of the controller. The three stages are respectively a de-energized stage (enclosure can not be open), an energized stage (enclosure can not be open), and a disconnected stage (enclosure can be open) for the power supply outlet to the appliance.

For fuller understanding of the nature and objects of the present invention, reference should be mode to the following detailed description taken in conjunction with the accompanying drawing.

These features and advantages of the present invention will be fully understood and appreciated from the following detailed description of the accompanying Drawings.

DETAILED DESCRIPTION OF THE PREFERRED EMBODIMENT

Figure 1A:
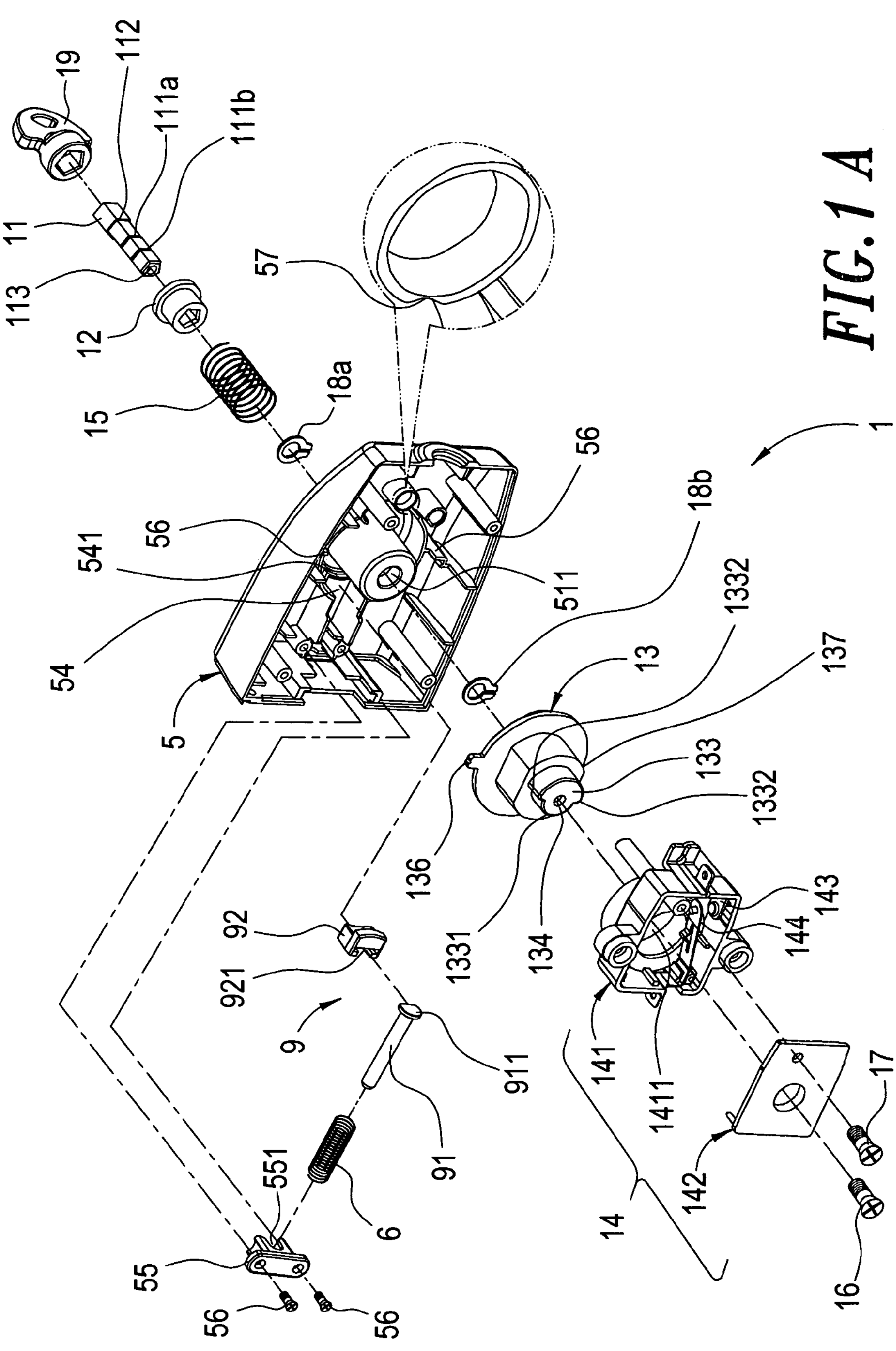
FIGS. 1A to 1C are the exploded views of the socket power supply control structure of the present invention.

The socket power supply control structure of the present invention comprises a controller 1, a lower housing 2, a plug with extension cords 3, a siamese twin plug and socket connector 4, an upper housing 5, a compressed spring 6, an enclosure 7, and a latch 9.

Figure 1B:
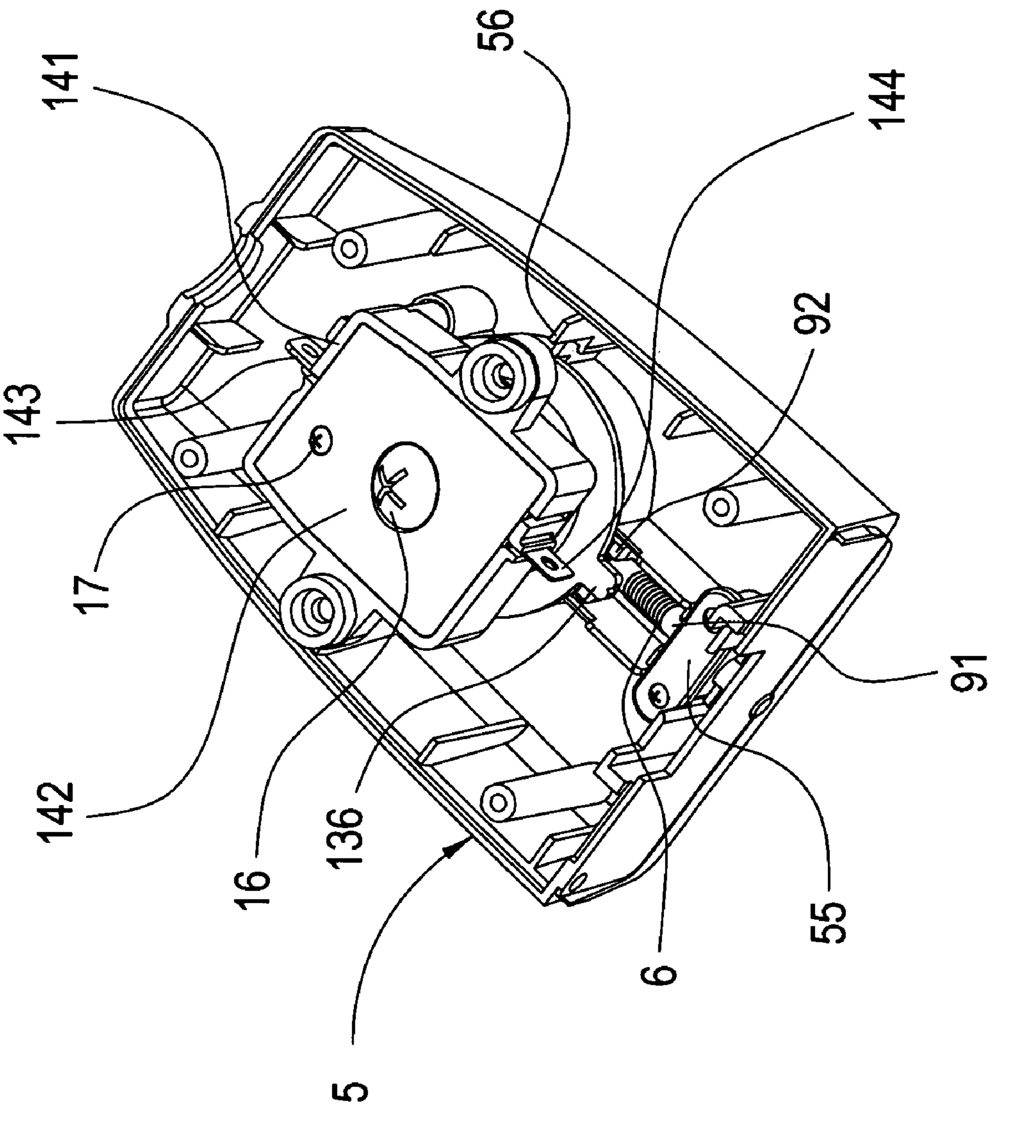
Figure 1C:
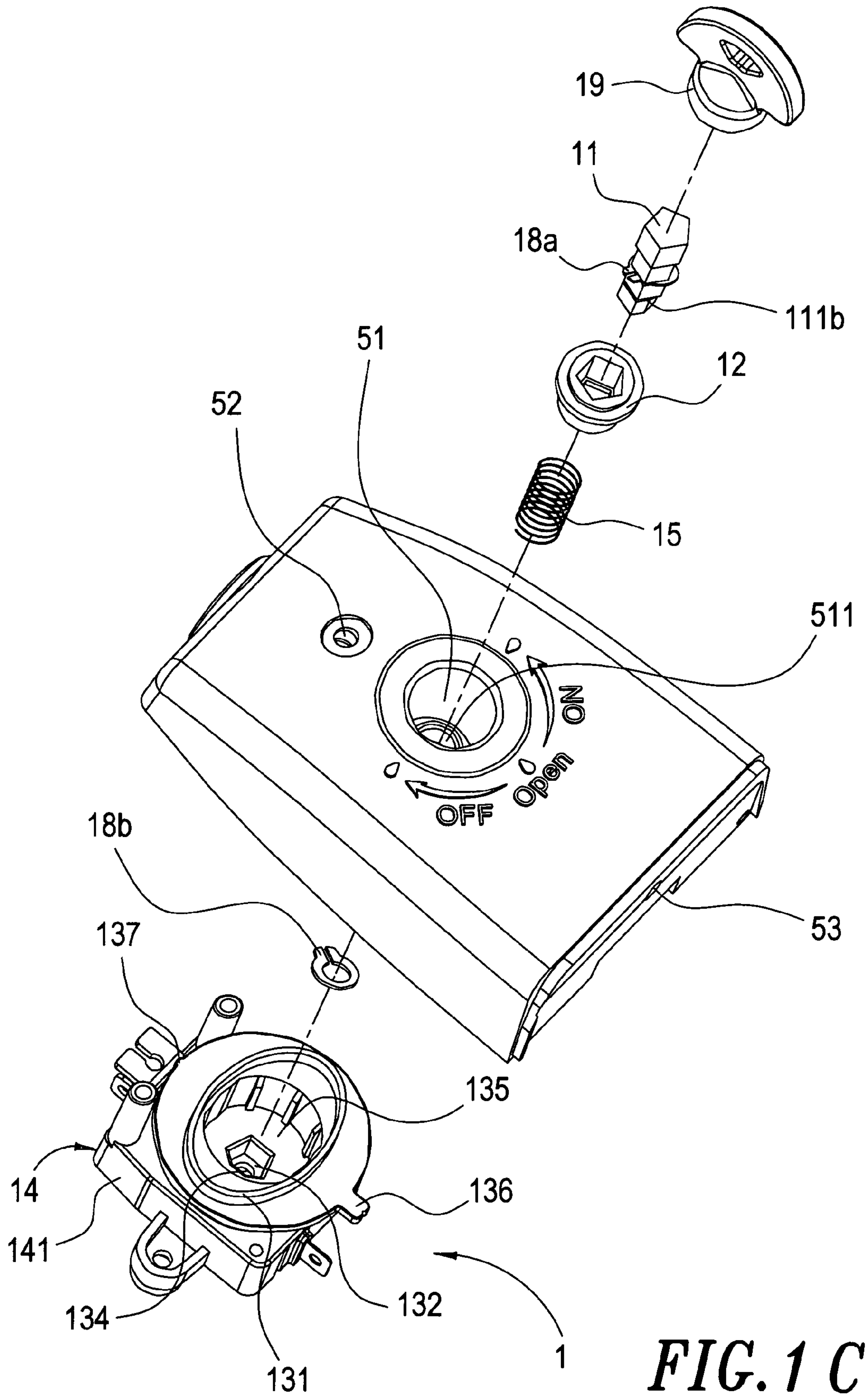

Referring to FIGS. 1A, 1B and 1C, the socket power supply control structure along with its upper housing are shown, the upper housing 5 has a downwardly disposed sleeve 51 on its top surface and provided with a bottom opening 511. An indicator lamp 52 is equipped at one side of the sleeve 51 to indicate if the plug and socket connector 4 is energized. A breach 53 is formed at one side of the upper housing 5. A sliding way 54 is formed on the inner wall surface of the upper housing 5 between the breach 53 and the sleeve 51. The sliding way 54 is provided with a damper 541 near the sleeve 51. A limitator 55 is fixed with screw 56 on the damper 541 nearby the breach 53. A guide slot 551 is formed at the bottom of the limitator 55 to form a guide hole when the guide slot 551 and the guide way 54 are mated. Two stopper plates 56 are provided on the bottom side of the upper housing 5 at two sides of the sleeve 51 facing with each other. A recessed slot 57 is formed on the upper housing 5 at the distant side of the slide way 54. The three stage controlling marks "energized (ON)", "de-energized (OFF)", and "disconnected (OPEN)" are labeled on the top edge of the sleeve 51. The latch 9 composed of a latch pin 91 and a L shaped stopper 92 is installed in the slide way 54 with its end stop block 911 clogged in a trap slot 921 of the stopper 92 so as to conjoin the latch 91 with the stopper 92 such that the stopper 92 can mate firmly with the damper 541 of the slide way 92 and the latch pin 91 can be inserted into the guide slot 551 of the limitator 55 to face against the breach 53 of the upper housing 5. A compressed spring 6 is wound around the latch pin 91 with its one end fixed to the stopper 92 and the other end impressing the wall surface of the limitator 55.

The controller 1 is composed of a key bolt 11, an opening member 19, a set sleeve 13, and a base box 14.

The key bolt 11, configurated in a pentagonal shape, has a stage portion 112 at its front end, and two guide grooves 111*a*, 111*b*, respectively formed at its middle and lower sections thereof. The middle set groove 111*a* is equipped with a C-ring 18*a*. The key bolt 11 has a screw hole 113 at its bottom and a collar 12 encircled around it. The bottom surface of the collar 12 is mated to the stage portion 112 so that it can not slip out of the top of the key bolt 11. A coil spring 15 is wound around the key bolt 11 with its one end fixed to the top edge of the color 12. When the key bolt 11 is inserted into the sleeve 51 of the upper housing 5 and pierces out of a bottom hole 511 of the set sleeve 51 along the guide groove 111*b* such that the key bolt 11 is fixed stationally in the sleeve 51 by another C-ring 18*b* encircled around the guide groove 111*b*. At this time, the other end of the spring 15 impresses the bottom surface of the sleeve 51 so as to support tightly the collar 12 and keep flush with the top surfaces of the sleeve 51 and the key bolt 11.

The switching member 19 is fitted on the key bolt 11 to turn the latter.

The set sleeve 13 has a protrusion 136 at one end, and a block 137 at the other end. An accommodation slot 135 of the set sleeve 13 is provided with a pentagonal clogging groove 132 on its bottom thereof An ellipsoidal cap nut 131 is extended out of the port of the accommodation slot 135. A tapered controlling pillar 133 is stretched downwards the bottom of the set sleeve 13 and has a through hole 134 formed at its center to communicate with the accommodation slot 135 and the clogging groove 132. Furthermore, the controlling pillar 133 has a recessed portion 1331 formed at one side of the pillar 133. A flipper 1332 is formed at each of the two sides of the recessed portion 1331. The set sleeve 13 is conjoined to the bottom of the upper housing 5 so that the accommodation slot thereof is able to cover the bottom end of the sleeve 51 formed with the upper housing 5. With this structure, when the key bolt 11 is put into the accommodation slot 135 in the set sleeve 13 and the bottom end of the key bolt 11 is retained in the clogging groove 132 so as to align the bottom tapped hole 113 of the key bolt 11 to the through hole 134 of the controlling pillar 133, the set sleeve 13 can be engaged with the key bolt 11 with a fastening screw 16 and able to rotate together with the key bolt 11 the major axis fringes of the ellipsoidal cap nut 131 is able to mate with the L shaped stopper 92 of the latch 9 so that the latch 9 can reciprocate by turning motion of the cap nut 131.

The base box 14 is essentially composed of a hollow housing 141 and a lid 142. The hollow housing 141 is provided with an opening 1411 at its top surface whereas a change over switch is installed at its one side. The change over switch includes a first and a second conductor blades 143 and 144 fastened at one side of the hollow housing 141 with both of their rear terminals exposed out of the hollow housing 141. The front end of the first conductor blade 143 is laid horizontally, on the other hand, the second one 144 is tilted, but normally the two blades 143 and 144 are not in contact with each other. An approximately triangular shaped stop block 1441 is formed at the center portion of the second conductor blade 144. The hollow housing 141 is sealed with the lid 142 using a fastening screw 17 from the bottom of the housing 141 thereof.

The set sleeve 13 is put into the base box 14 through the opening 1441 of the base box 14 so as to settle the set sleeve 13 such that the recessed portion 1331 of the controlling pillar 133 stretched from the bottom of the set sleeve 13 is faced to the stop block 1441 of the second conductor blade 144.

Figure 2:
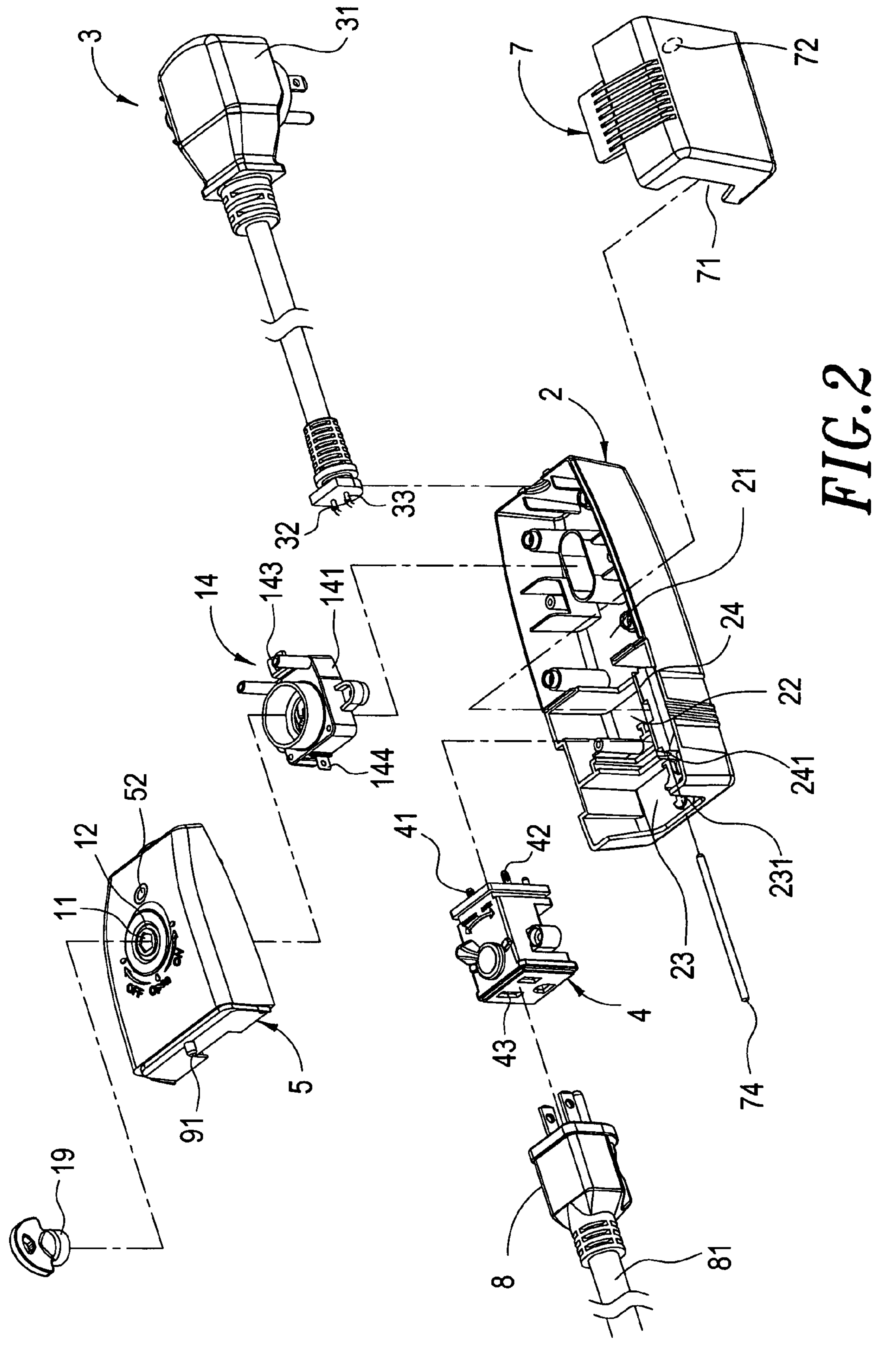
FIG. 2 is an exploded view of the whole structure of socket power supply control structure according to the present invention.
Figure 2A:
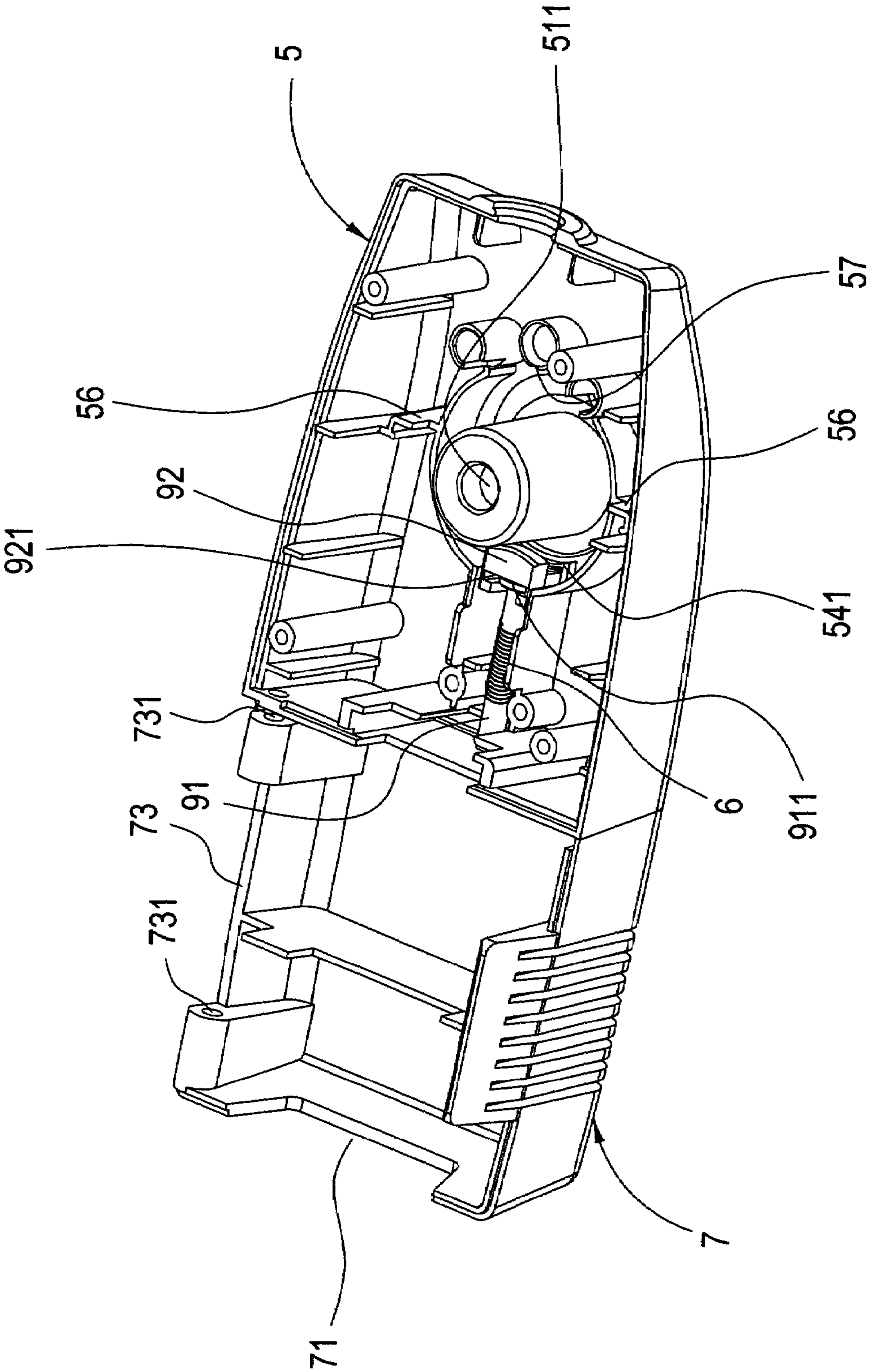
FIG. 2A is a schematic view of the upper housing and the latch.
Figure 3A:
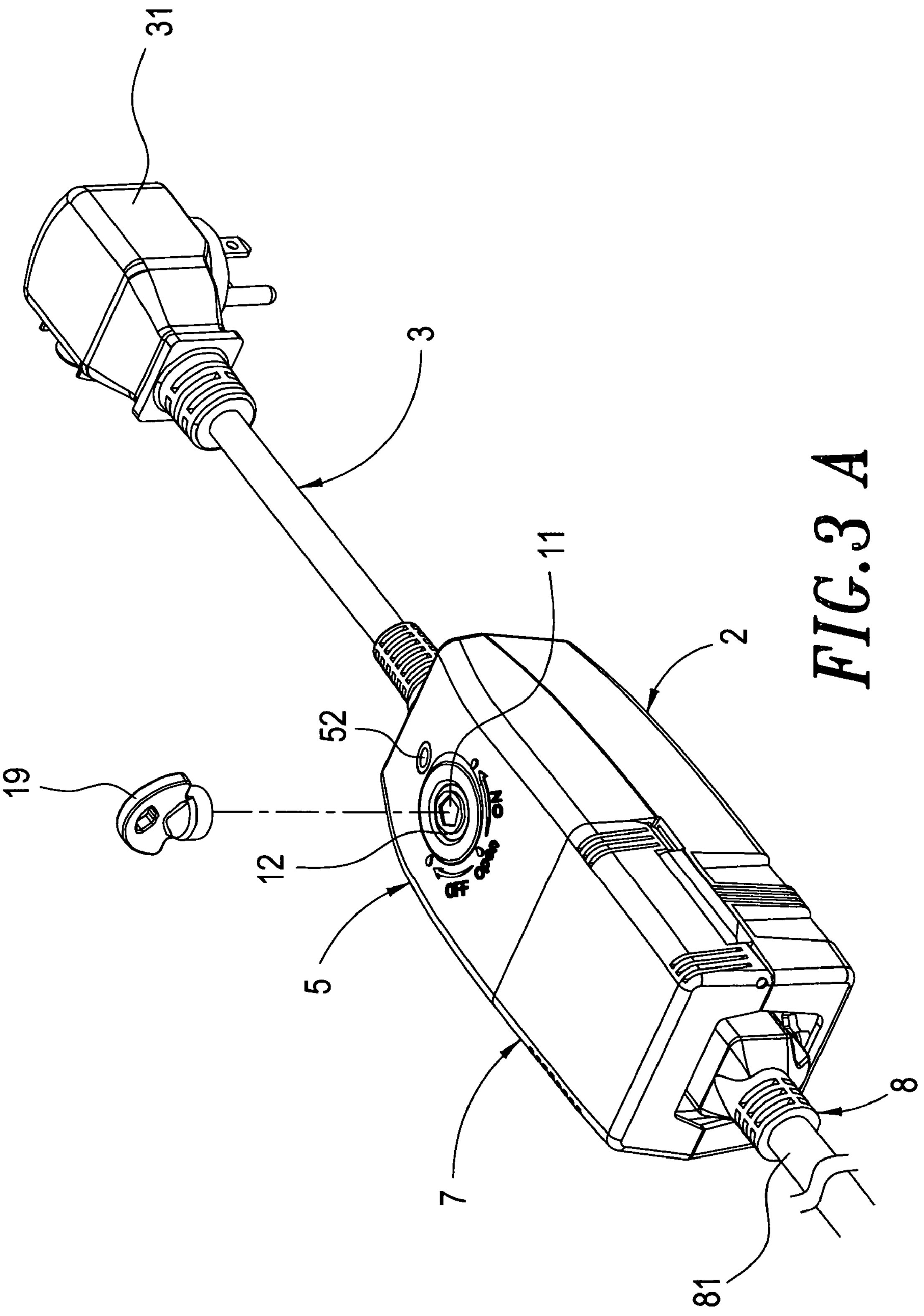
FIG. 3A is an assembly view of the present invention.
Figure 3B:
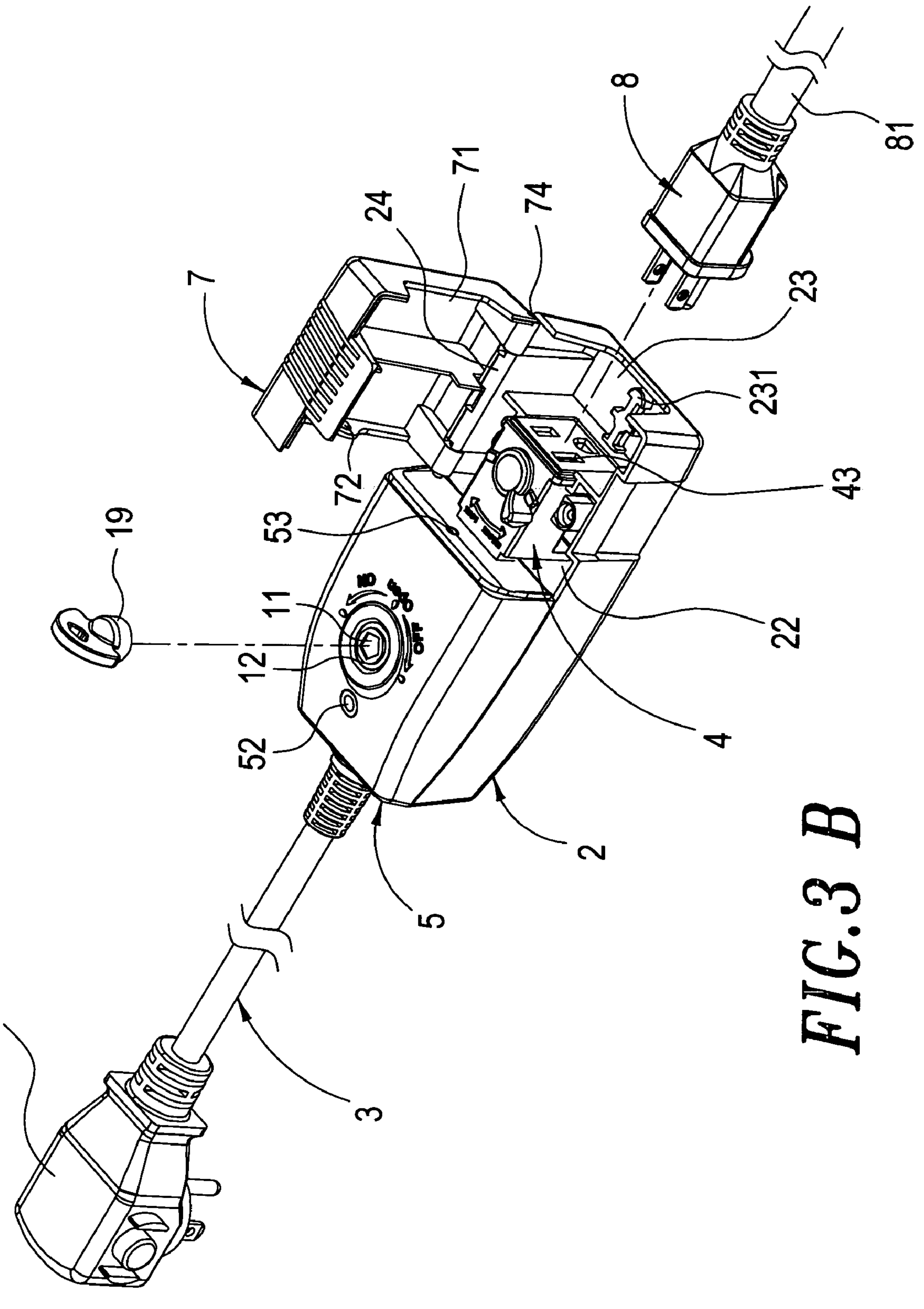
FIG. 3B is an assembly view of the present invention where the enclosure is open.
Figure 4A:
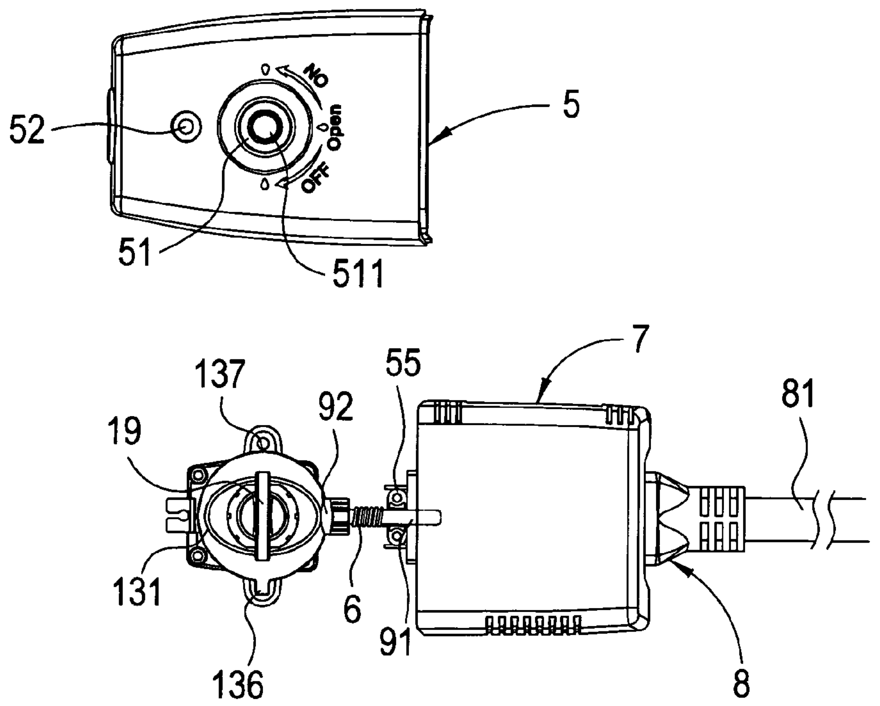
FIGS. 4A and 4B are schematic views for illustration of the first stage controlling mode.
Figure 4B:
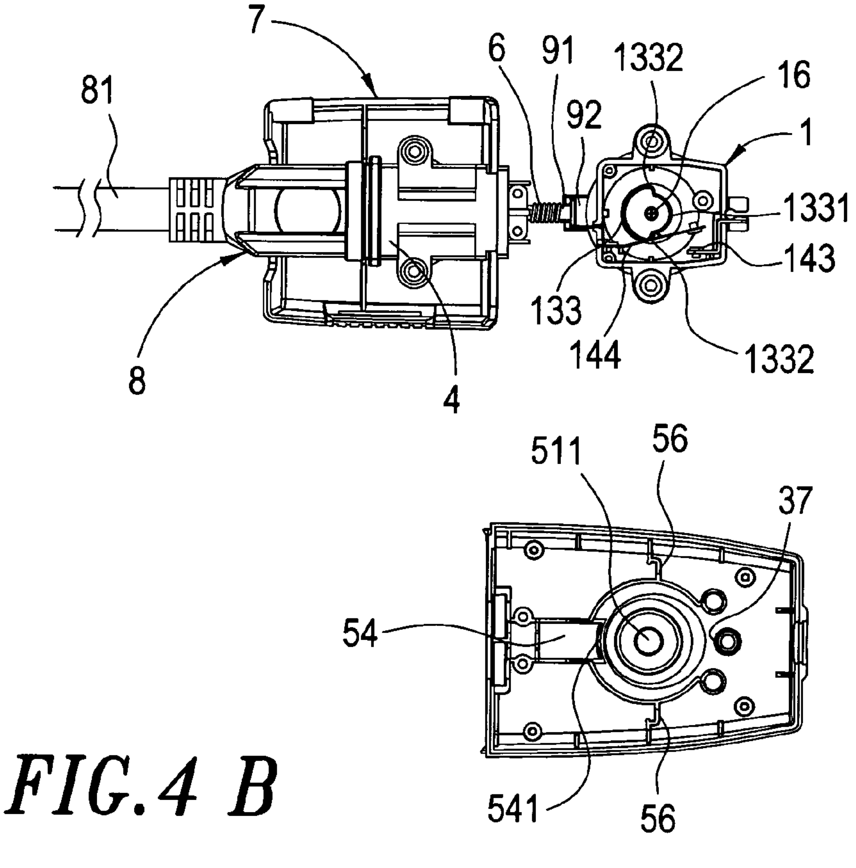

Referring to FIGS. 2 and 3A, 3B, the exploded and assembly views of the structure of the present invention wherein a lower housing 2, a plug with extension cords 3, a siamese twin plug and socket connector 4, an upper housing 5, a latch 9 and an enclosure 7 are shown.

The lower housing 2 has a first, a second, and a third accommodation spaces 21, 22, and 23. Wherein a hinged block 24 with a through hole 241 is formed at one side of the second and third accommodation spaces 22 and 23. A base box 14 of the controller 1 is fixed in the first accommodation space 21. The set sleeve 13 is settled in the base box 14 through an opening 1441 by enclosing the first accommodation space 21 with the upper housing 5 together with the assembled key bolt 11 and the latch 9 so as to aging the recessed portion 1331 of the controlling pillar 133 to the central stop block 1441 of the second conductor blade 144. The third accommodation space is prepared for placing a power input plug 8 of the electrical appliance and has detention means 231 to hold the power input plug 8 so that it is assured not to be pulled away from the siamese twin plug and socket connector 4 accidentally.

The plug with extension cords 3 is provided with a source side plug 31 at the front side and a live wire 32 and a grounding wire 33 extended from the rear side the rear portion of the plug with extension cords 3 is placed in the first accommodation space 21 of the lower housing 2 distantly apart from the second accommodation space 22 with its live wire 32 connected to the terminal of the first conductor blade 143 of the controller 1.

The siamese twin plug and socket connector 4 has at least a live terminal 41 and a grounding terminal 42 extended from its rear end, while the front portion of the connector 4 is formed into a source side socket 43. The plug and socket connector 4 is disposed in the second accommodation space 22 of the lower housing 2. The source side socket 43 is facing to the third accommodation space 23 to accept insertion of the power input plug 8 of the load side electrical appliance. Unless the live terminal 41 of the plug and socket connector 4 is connected to the terminal of the second conductor blade 144 of the controller 1 and the grounding terminal 42 is connected to the grounding wire 33 of the plug with extension cords 3 so as to bring the first and the second conductor blades 143 and 144 in the controller 1 to mutually in contact with each other, the plug with extension cords 3 will not be able to feed power to the plug and socket connector 4.

The enclosure 7 has a through hole 71 opened at its end portion to admit passing the cords 81 of the electrical appliance at load side. An insertion hole 72 is provided on the front top surface of the enclosure 7. An indentation 73 with a hinge hole 731 formed at each of the two sides is provided at one side of the enclosure 7. By covering the enclosure 7 on the second and third accommodation spaces 22, 23 of the lower box 2 and inlaying the hinged block 24 in the indentation 73 and aligning the through hole 241 of the hinged block 24 to both hinge holes 731 so as to pierce a hinge pine 74 there through and hinge the enclosure 7 to one side of the lower box 2 thereby enabling the enclosure 7 to turn on the lower box 2 about the hinge pin 74, whereas the insertion hole 72 of the enclosure 7 is aligned to and communicated with the opening 511 of the upper housing 5. By so the latch pin 92 is able to pass through the insertion hole 72 and latch the enclosure 7 so as to fix the enclosure 7 tightly covering the second and third accommodation spaces of the lower housing 2.

Hereinafter, the three stage control mode disclosed by the present invention will be depicted in conjunction with FIG. 4A through FIG. 6B. Before operation, a switching member 19 (key) should be inserted into the key bolt 11 of the controller 1. To understand the first stage control mode, reference should be made to FIGS. 4A and 4B in which the operational procedures in this stage are illustrated. The switching member 19 inserted into the key bolt 11 pushes down the collar 12 so as to cause the compressed spring 15 produce an elastic force and enable the controller 1 to operate. Of course the collar 12 will return to its initial location by the restoring force of the spring 15 as soon as the switching member 19 is taken off. The first stage operation is shown as in FIGS. 4A and 4B. By turning the key bolt 11 with the switching member 19 to "OFF" mark on the upper housing 5 so as to bring the protrusion 136 of the set sleeve 13 to mate with one of the stopper plates 56 of the upper housing 5. By so, being pushed by one of the major axis edge of the ellipsoidal cap nut 131, the latch pin 91 will be pushed into the breach 53 of the upper housing 5 and the insertion hole 72 of the enclosure 7 to lock the enclosure 7 in irremovable stage, and the compressed spring 6 is in compressed stage. At this instant the one of the flipper 1332 formed on the recessed portion 1331 of the controlling pillar 133 is mating the stock block 1441 of the second conductor blade 144 which causes the second conductor blade 144 could not be pressed downwards to contact the first conductor blade 143 and hence the plug and socket connector 4 could not get power supply and is in "de-energized" stage. In this state the power input plug 8 of the load side electrical appliance is also unable to be separated and could not be remove to other power source. In this first stage control mode the enclosure 7 could not be removed either.

Figure 5A:
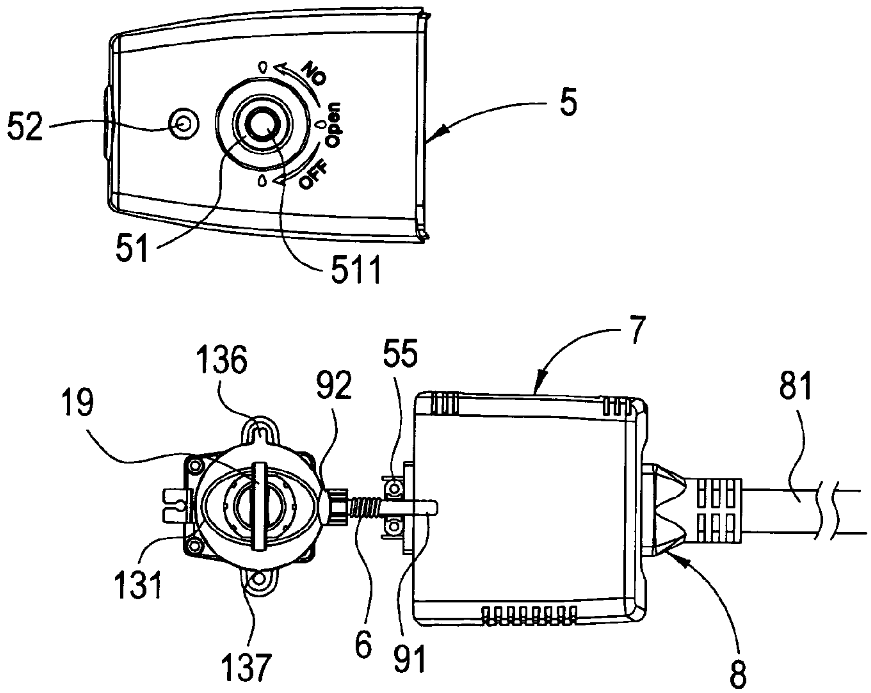
FIGS. 5A and 5B are schematic views for illustration of the second stage controlling mode.
Figure 5B:
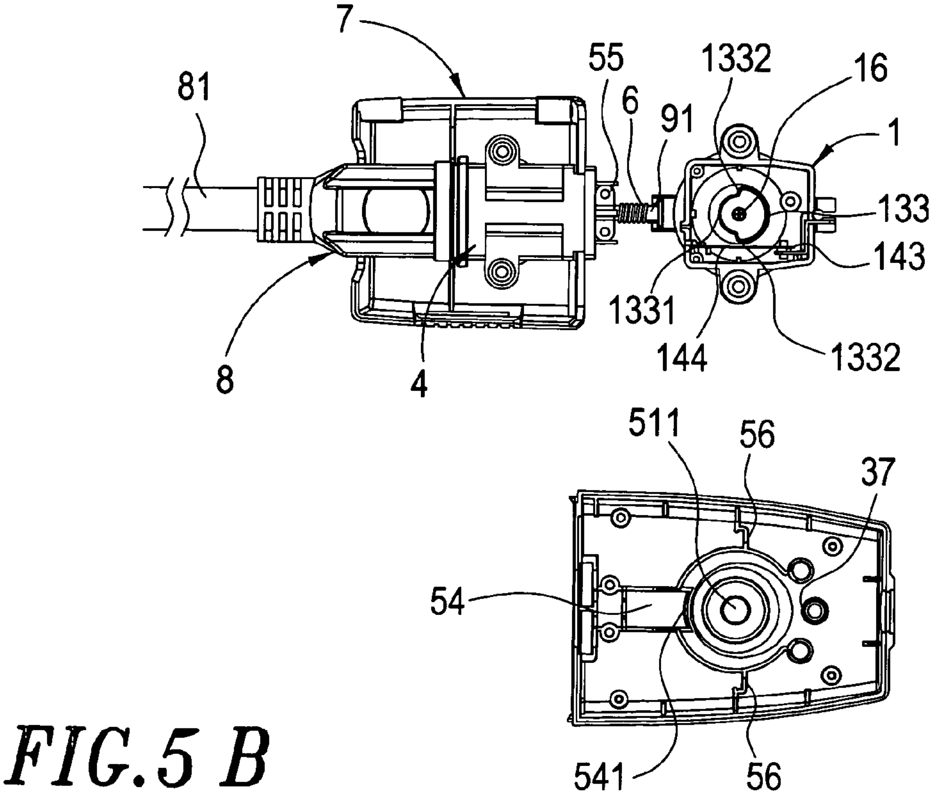

To understand the second stage control mode, reference should be made to FIGS. 5A and 5B in which the operational procedures in this stage are illustrated. The switching member 19 inserted into the key bolt 11 is turned to mark "ON" on the upper housing 5 so as to bring the protrusion 136 to mate with another stopper plate so as to turn the controlling pillar 133 of the set sleeve 13 a certain angle that liberates the stop block 1441 of the second conductor blade 144 from the detention of the recessed portion 1331 of the controlling pillar 133 and causes the stop block 1441 to contact the pillar 133. In this case the second conductor blade 144 is pressed down to contact the first conductor blade 143 and bring the power to energize the plug and socket connector 4 therefore the electrical appliance at load side can be fed. At this instant the other protruded fringe of the ellipsoidal cap nut 131 pushes the latch pin 9 forwards to advance a certain distance so as to insert its latch pin 91 into the breach 53 and the insertion hole 72 of the enclosure 7. At this moment the compressed spring 6 is in compressed stage so that the enclosure 7 could not be taken off, then the plug and socket connector 4 is in "energized" stage.

Figure 6A:
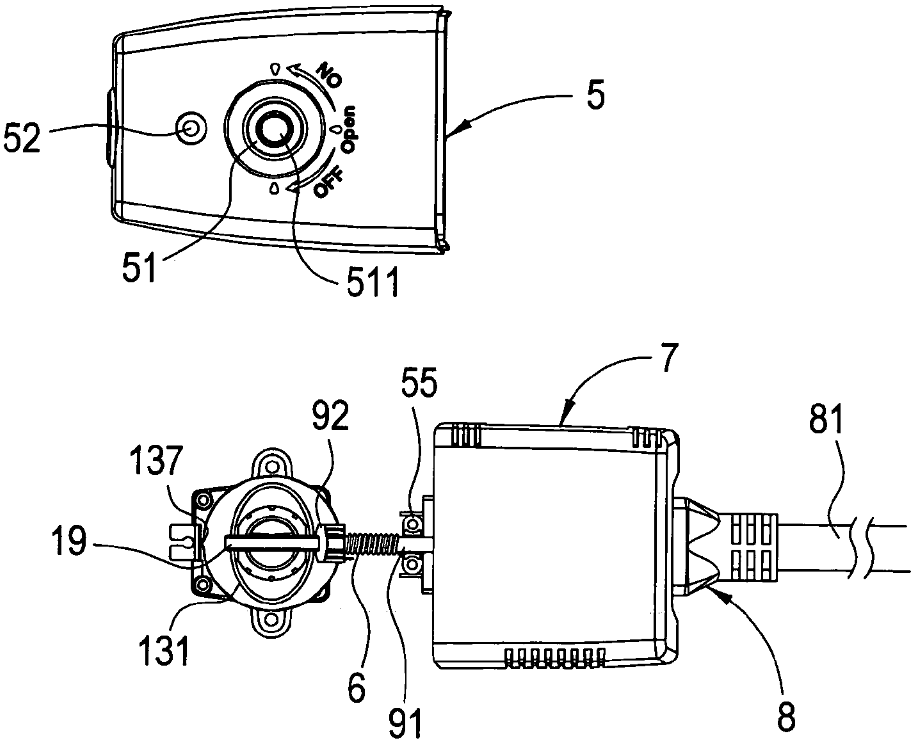
FIGS. 6A and 6B are schematic views for illustration of the third stage controlling mode.
Figure 6B:
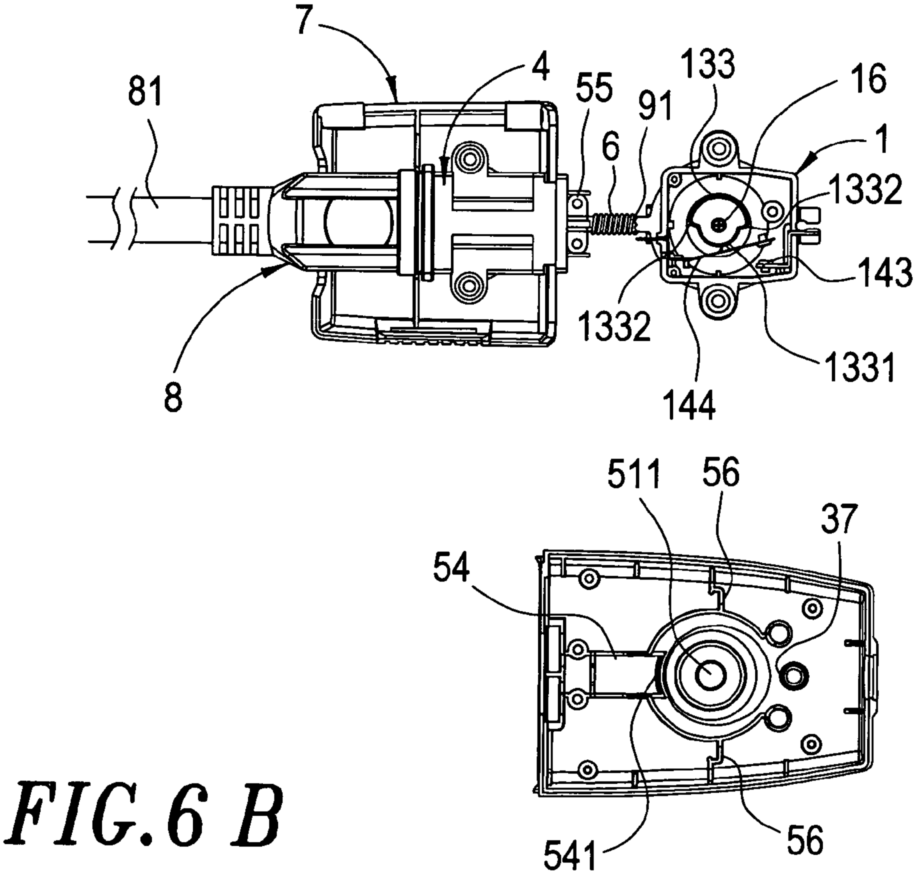

To understand the third stage control mode, reference should be made to FIGS. 6A and 6*b* in which the operation al procedures in this stage are illustrated. The switching member 19 inserted into the key bolt 11 is turned to mark "OPEN" on the upper housing 5 so as to bring the block 137 of the set sleeve 13 to confined in the recessed slot 57 of the upper housing 5, the controlling pillar 133 further advances such that the stop block 1441 is clogged in the recessed portion 1331 and contracts the other side flipper 1332. By so the first and the second conductor blades 143 and 144 are separated each other and the power supply could not reach the plug and socket connector 4. At this instant the latch 9 is loosely in contact with the minor axis fringe of the ellipsoidal cap nut 131 so that its can return to its initial position with the restoring force of the compressed spring 6 fitted on it. Since the latch pin 91 is also released from the insertion hole 721 of the enclosure 7, the enclosure 7 can be lifted to allow putting in or taking out the power input plug 8 from the second accommodation space 22 of the lower housing 2. Accordingly, in the third stage controlling mode, the power supply to the plug and socket connector 4 is completely disconnected.

The three stage controlling mode described above is only one preferred embodiment of the present invention provided for purpose of reference and explanation, and shall not be construed as limitations applicable to the invention herein.

It emerges from the above description that the socket power supply control structure of the present invention has several distinct advantages compared with any conventional outlet, namely:

1. The operation of the controller is carried out with a simple switching key.

2. The ingeniously designed three stage controlling mode allows the use of the outlet conveniently and securely.

3. It is widely applicable to many electrical appliances so as to protect the children's health of eyes and physical security.

Many changes and modification in the above described embodiment of the invention can of course, be carried out without departing form the scope thereof. Accordingly, to promote the progress in science and the useful arts, the invention is disclosed and is intended to be limited only be3 the scope of the appended claims.

What is claimed is:

1. A socket power supply control structure, comprising:

a lower housing and an upper housing, wherein the lower housing has a first, a second, and a third accommodation spaces, and an enclosure hinged to one side of the second and the third accommodation spaces so as to turn open or close the lower housing, the enclosure has an insertion hole formed on an end surface near the first accommodation space while has an opening on the other side, wherein the upper housing has a sleeve on a top surface, the sleeve has an opening formed on bottom, a breach is formed at one side of the upper housing, and a sliding way is formed between the sleeve and the breach;

a controller including a key blot, a set sleeve, and a base box, wherein the key bolt is installed in the set sleeve to keep top of the key bolt flush with the set sleeve so as to allow insertion of a switching member, whereas the bottom end of the key bolt is extended to reach an opening of the set sleeve, the set sleeve is engaged to the bottom of the upper housing so as to cover the sleeve of the upper housing over the bottom surface thereof, thereby the key bolt and the set sleeve are tightly conjoined to expose an insertion hole as the set sleeve turns together with the key bolt;

a cap nut having a controlling pillar formed around the middle section of the set sleeve, wherein the controlling pillar is extended downwards from the bottom of the cap nut and is turnable together with the insertion hole, the controlling pillar is further engaged to the base box having a change over switch equipped at the middle section thereof, and the change over switch is carried out by the controlling pillar, by settling the base box combined to the controller in the first accommodation space and covering the upper housing along with assembled key bolt and set sleeve on the first accommodation space so as to allow the controlling pillar capable to make switching of the change over switch through aligning the breach to the insertion hole;

a plug with extension cord disposed in the first accommodation space at one side distantly apart from the second accommodation space with a live wire thereof connected to one of the terminals of the change over switch installed in the base box; and a plug and socket connector disposed between the first and the second accommodation spaces and connected to the other terminal of the change over switch so as to receive power from the plug with extension cord, and facing a source side socket thereof to the second accommodation space, by way of turning the key bolt with the switching member, the set sleeve, the controlling pillar and the cap nut are actuated to turn in order and determined whether the enclosure is removed or not, and the plug and socket connector is to be energized or not thereby performing a multi-stage controlling mode.

2. The socket power supply control structure as in claim 1, wherein the key bolt has a stage portion at front end, and two guide grooves respectively formed at middle and lower sections thereof, whereas a lower guide groove is emerged out of the opening of the upper housing, both guide grooves are each equipped with a C-ring so as to fix the key bolt in the upper housing sleeve, the key bolt has a screw hole at bottom for screw engaging with the controlling pillar, the outer surface of the key bolt is encircled with a collar whose bottom surface is in mate with the stage portion of the key bolt so as to prevent the stage portion from being slipping out of the top of the key bolt, a coil spring is wound around the key bolt with one end fixed to the top edge of the collar, when the key bolt is inserted into the sleeve of the upper housing and pierces out of a bottom opening of the sleeve along the lower guide groove such that the key bolt is fixed stationally in the set sleeve by the C-ring encircled around the lower guide groove thereby settling the key bolt in the sleeve of the upper housing, at this time the other end of the coil spring impresses the bottom surface of the sleeve so as to support tightly the collar and keep flush with the top surfaces of the sleeve and the key bolt.

3. The socket power supply control structure as in claim 1, wherein the third accommodation space is for accommodating an power input plug of an electrical appliance, and a detention means thereof to hold the power input plug is provided so as to assure the power input plug will not be pulled away from the plug and socket connector accidentally.

4. The socket power supply control structure as in claim 1, wherein the plug with extension cord is connected to the plug and socket connector with a front terminal, and has at least one live wire and one grounding wire emerged from a rear terminal, the live wire is connected to the change over switch installed in the controller, while the grounding wire is connected to the plug and socket connector.

5. The socket power supply control structure as in claim 1, wherein an indicator lamp is provided on the upper housing to indicate electrical stage of the plug and socket connector.

6. The socket power supply control structure as in claim 1, wherein the controller is functional in three stage controlling mode.

7. The socket power supply control structure as in claim 1, wherein the enclosure has an indentation with a hinge hole formed at each of two sides, and a hinged block with a through hole is formed at one side of the second and the third accommodation spaces, by covering the enclosure on the second and the third accommodation spaces and inlaying the hinged block in the indentation and aligning the through hole of the hinged block to both hinge holes of the hinged block so as to penetrate a hinge pin through the hinge holes and hinge the enclosure to one side of the lower box thereby enabling the enclosure to turn on the lower box about the hinge pin.

8. The socket power supply control structure as in claim 1, wherein the cap nut is an approximately ellipsoidal cap nut.

9. The socket power supply control structure as in claim 1, wherein the plug and socket connector is a siamese twin plug and socket connector.

* * * * *